Dec. 5, 1961     G. O. DAVIS     3,011,850
POWER OPERATING ADJUSTABLE BROILER FOR COOKING RANGES
Filed Jan. 26, 1959     2 Sheets-Sheet 1
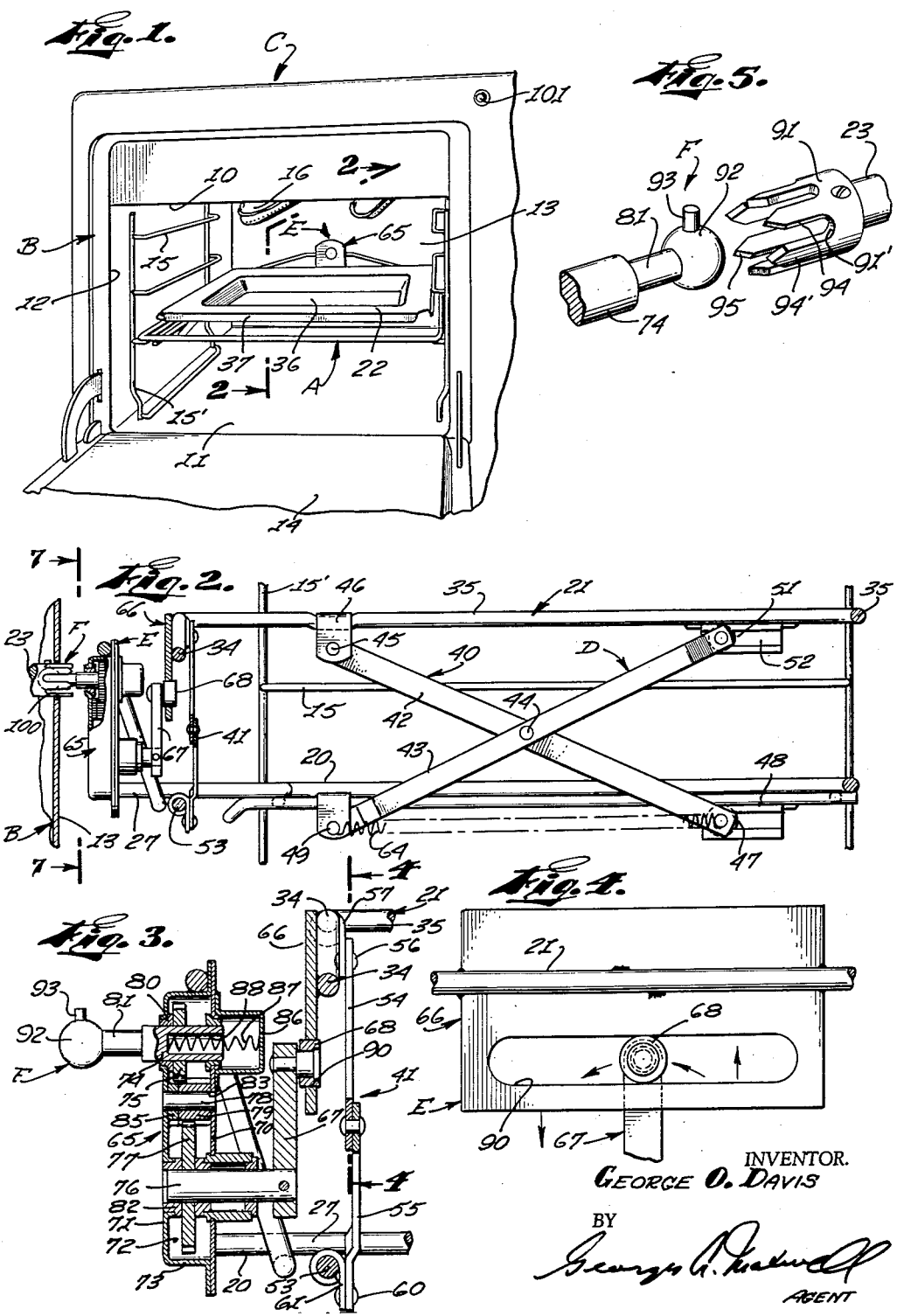
INVENTOR.
GEORGE O. DAVIS

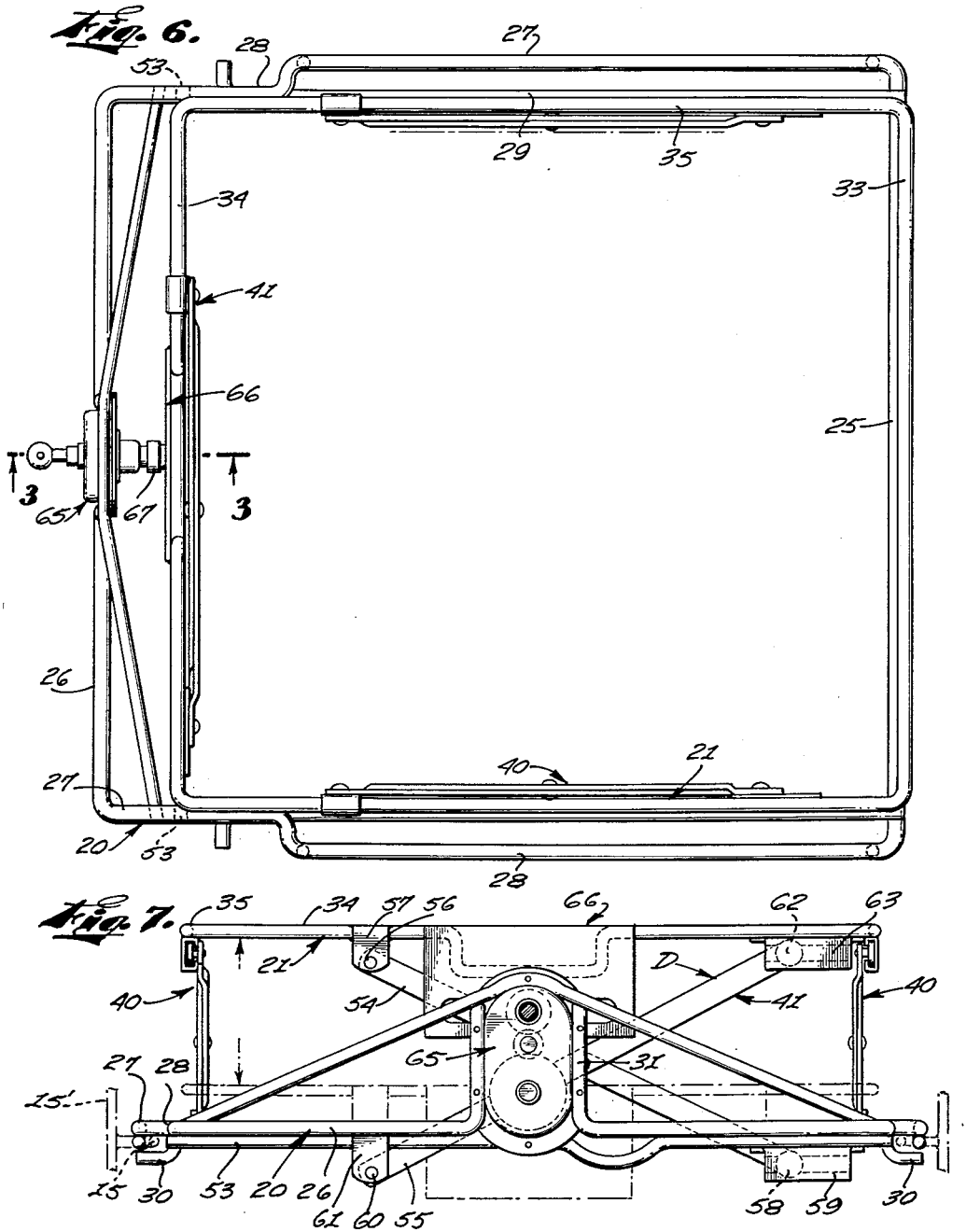

United States Patent Office 3,011,850
Patented Dec. 5, 1961

3,011,850
POWER OPERATING ADJUSTABLE BROILER FOR COOKING RANGES
George O. Davis, Arcadia, Calif., assignor to O'Keefe & Merritt Company, Los Angeles, Calif., a corporation of California
Filed Jan. 26, 1959, Ser. No. 788,897
10 Claims. (Cl. 312—306)

This invention relates to cooking ranges and is more particularly related to broilers for cooking ranges or stoves, it being a general object of the invention to provide a power operated adjustable broiler which is simple and practical and which may be quickly and easily adjusted or regulated in relation to a cooking burner or other source of heat.

In the prior art, adjustable broiler constructions of various types have been provided for engagement in the broiler compartments of cooking ranges. The adjustable broilers of the prior art have been characterized by manually operable mechanisms for shifting the grids or broiler pans vertically and, as a result, require that the door for the broiler compartment in the range be open in order to gain access to the said mechanisms, and also require the operator of the construction to engage certain parts of the mechanism in his hands in order to effect operation of the mechanism. Due to the fact that the adjustment of a broiler is frequently necessary when it is in use and heated, operation of the ordinary manually operated adjustable broiler is extremely hazardous since the element or elements which must be engaged by the operator's hand are often extremely hot.

Another disadvantage of some ordinary adjustable broiler constructions of the prior art resides in the fact that they cannot be shifted or adjusted to any desired position between their upper and lowermost positions, but can only be shifted and set in predetermined intermediate positions. The above is due to the fact that, because of the heat to which the operating mechanisms are subjected and the variable loads which they are required to support, they must be rather simple mechanisms and must include positive latch type locking means, or the equivalent, to hold them in their set positions.

It is an object of the present invention to provide an electrically operated mechanism for effecting movement or adjustment of a grill, or the like, with relation to a heat source.

Another object of the present invention is to provide a broiler construction of the character referred to adapted for incorporation in a conventional cooking range without requiring major modification or alteration of the range.

Another object of the present invention is to provide a broiler construction of the character referred to which is sturdy and which is capable of withstanding high temperatures over long periods of time. The structure or mechanism that I provide effectively withstands cooking temperatures and works equally well whether hot or cold.

A further object of the invention is to provide a broiler construction of the character referred to in which the operating mechanism for effecting adjustment thereof is releasably coupled with a prime mover such as an electric motor mounted on the range, which prime mover is under control of a conveniently accessible control means, such as a switch, at the exterior of the range.

It is an object of the present invention to provide a construction of the character referred to which is light in weight and which can be easily and conveniently removed from the range compartment in which it is engaged, for the purpose of cleaning and/or storing.

A further object of the present invention is to provide a structure of the character referred to having a novel gear drive and a novel releasable coupling means between the gear drive and the motor.

Another object of my invention is to provide an adjustable broiler involving few, simple, sturdy, and durable parts, which are compactly arranged for easy care and maintenance by persons having little or no mechanical skill.

Another object of the present invention is to provide a locking means whereby the structure, when shifted out of engagement with the range and with the prime mover, will not shift out of adjustment or collapse.

Another object of my invention is to provide a structure of the character referred to wherein the locking means is associated with the gear drive.

A further object of the present invention is to provide a structure of the character referred to wherein the prime mover carried by the range is also adapted to drive a suitable rotisserie construction which is adapted to be engaged with the range when the broiler construction is removed, thereby making it unnecessary to provide a separate prime mover for two such mechanisms.

The various objects and features of my invention will be fully understood from the following detailed description of a typical preferred form and application of the invention, throughout which description reference is made to the accompanying drawings, in which:

FIG. 1 is a perspective view of a portion of a cooking range showing the broiler compartment and the broiler construction that I provide engaged therein.

FIG. 2 is a detailed sectional view of the broiler construction that I provide and taken as indicated by line 2—2 on FIG. 1.

FIG. 3 is an enlarged detailed sectional view of a portion of my new broiler construction, taken as indicated by line 3—3 on FIG. 6.

FIG. 4 is an elevational view of a portion of my new construction, taken as indicated by line 4—4 on FIG. 3.

FIG. 5 is a perspective view of the releasable coupling means that I provide.

FIG. 6 is a plan view of the new broiler construction provided by the present invention.

FIG. 7 is an end elevational view of the new broiler that I provide, taken as indicated by line 7—7 on FIG. 2.

In FIG. 1 of the drawings, I have shown the broiler construction A of the present invention engaged in a cooking compartment B of a cooking range C. Only that portion of the cooking range C in which the compartment B occurs is shown.

The compartment B is shown as a typical broiler or oven compartment having flat, horizontally disposed top and bottom walls 10 and 11, flat, vertically disposed side and rear walls 12 and 13, and an open front. The open front of the compartment B is closed by a suitable door 14 pivotally connected to the stove construction at the lower forward end of the compartment B.

The compartment B is provided with suitable, vertically spaced, horizontally disposed rails 15 at or along its side wall 12, and a plurality of burners or heating elements 16 adjacent the bottom side of the top wall 10 thereof. The rails 15 are adapted to support the broiler construction A of the present invention or, when the construction A that I provide is not in use, to support a rotisserie mechanism and/or suitable oven racks and pans.

The broiler construction A is shown as including, generally, a supporting frame 20 adapted to slidably engage the rails 15 in the compartment B and to be supported thereby, a carrier frame 21 to occur above the support frame and adapted to carry a suitable broiler pan 22, or the like, adjustable brace means D pivotally connected with and extending between the frames 20 and 21 and adapted to maintain the frames in parallel planes when they are shifted vertically relative to each other, operating means E fixed to and coupled between the frames 20 and 21 to shift the frames vertically relative to each other, a prime mover carried by the range (not shown), and having a power shaft 23, and releasable coupling means F between the operating means and the shaft 23.

The support frame 20 is a substantially rectangular member formed of rod or bar stock and has parallel, horizontally disposed front and rear rails 25 and 26 and parallel, horizontally disposed side rails 27. The side rails 27 of the frame 20 are adapted to slidably engage the top sides of the support rails 15 in the range compartment B, while the rear rail 26 is adapted to support a part or portion of the operating means E.

In the preferred carrying out of the invention the support rails 15 in the compartment B are simple, elongate, horizontally disposed bars having laterally outwardly turned ends fixed to suitable standards 15' arranged in the compartment B so that they extend in spaced parallel relationship to the adjacent side walls of the compartment, as clearly illustrated in FIG. 1 of the drawings.

In the preferred carrying out of the invention and as illustrated in the drawings, the rear end portions of the side rails 27 of the frame 20 are laterally inwardly offset, as at 28. Suitable retaining rods 29 are arranged to extend between the said offset portions of the side rails and the front rail 25, so that they are parallel and spaced laterally inwardly of the forward portions of the side rails. The rods 29 are secured to the bottom sides of the adjacent parts of the frame 20 and are adapted to occur adjacent and slidably engage the inner sides of the support rails 15 in the compartment B to thereby guide and maintain the frame 20 in proper working position with the rails 15 and in the compartment B.

The rear end portion of the rods 29 are provided with downwardly and rearwardly projecting extensions with laterally outwardly turned fingers 30. The fingers 30 are adapted to project below and engage the bottom side of the rails 15 and serve to prevent the frame 20 from tipping when it is pulled or drawn forwardly along the rails in a manner to project forwardly from the open front of the compartment B.

The offset portions 28 on the side rails of the frame 20 are provided to facilitate engagement of the finger 30 below the support rails 15.

In the form of the invention illustrated, the rear rail 26 of the frame 20 is split intermediate its ends and is provided with laterally spaced, upwardly turned standards 31 adapted to support a portion of the operating means E, as will hereinafter be described.

The carrier frame 21 is a simple, rectangular frame formed of bar or rod stock and involves parallel, horizontally disposed front and rear rails 33 and 34 and horizontally disposed parallel side rails 35. The frame 21 is slightly smaller than the frame 20 and occurs in spaced relationship thereabove.

The broiler pan 22 shown in FIG. 1 of the drawings is a typical broiler pan and has a main portion 36, which occurs within the confines of the frame 21, and a peripheral flange 37 which overlies and rests on the frame 21 about the entire perimeter thereof.

The adjustable brace means D pivotally connected with and extending between the frames 20 and 21 and adapted to maintain the frames in parallel planes when they are shifted vertically relative to each other by the operating means E, is shown as including like pantograph, or parallel motion type, link means 40 between the adjacent rods 29 and side rails 25 of the frames 20 and 21, and a similar type link means 41 between the rear rail 34 of the frame 21 and the rear portion of the frame 20.

The link means 40 at each side of the construction involves a pair of elongate links 42 and 43 pivotally connected together at a point intermediate their ends by a suitable pivot pin 44. The link 42 of each means 40 has its rear end pivotally connected to its related side rail 35 by means of a suitable pivot pin engaged through a bracket 46 fixed to the said rail at its rear end portion. The forward end of the link 42 is provided with a roller 47, which roller is engaged in a suitable track 48 fixed to and extending parallel with the forward portion of the rod 29 related thereto.

The link 43 of each link means 40 has its rear end pivotally connected to its related side rod 29 by means of a suitable pivot pin 49 engaged through a bracket 50 fixed to the rod 29 at its rear end portion, while the forward end of the link 42 is provided with a roller 51, which roller is engaged in a suitable track 52 fixed to and extending parallel with the forward end portion of the related rail 35.

With the link means 40 set forth above, it will be apparent that when the frame 21 is shifted vertically relative to the frame 20, the said means maintains the frames in longitudinal, parallel relationship with each other.

The link means 41 of the means D includes a horizontally disposed beam rod 53 fixed to and extending between the side rails 27 of the frame 20, to occur forward of the rear rail 26 and below the rear rail 34 of the frame 21, and a pair of elongate links 54 and 55 pivotally connected to each other at a point intermediate their ends. The link 54 of the means 41 has one end pivotally connected to the rail 34 by means of a pivot pin 56 engaged through a bracket 57 fixed to the rail. The link 54 has a roller 58 at its other end, which roller is slidably engaged in a suitable track 59 fixed to and extending parallel with the beam rod 53. The link 55 of the means 41 has one end pivotally connected to the beam rod 53 by means of a suitable pivot pin 60 engaged through a bracket 61 on the beam. The link 55 has a roller 62 at its other end, which roller is engaged in a suitable track 63 fixed to and extending parallel with the rail 34 of the frame 21.

With the link means 40 set forth above, it will be apparent that when the frame 21 is shifted vertically relative to the frame 20 the said means maintains the frames 20 and 21 in lateral parallel relationship with each other.

From the foregoing, it will be apparent that the brace means D, in addition to maintaining the frames 20 and 21 in parallel relationship with each other when they are shifted relative to each other, also prevents the frame 21 from yielding or sagging to one side or at one end, as a result of uneven distribution of foodstuff and weight thereon.

In addition to the foregoing, the brace means D further includes suitable tension springs 64 engaged between the lower ends of the arms 42 and 43 of the link means 40. The springs 64 counteract or balance the weight of the frame 21 and the broiler pan 22, and thereby materially reduce the effort which must be exerted by the means E to raise and lower the frame, as will be hereinafter described.

The operating means E adapted to shift the frame 21 relative to the frame 20 is shown as including a transmission 65 carried by the frame 20, a cam plate 66 carried by the frame 21, a crank 67 driven by the transmission and carrying a cam follower 68, which follower is engageable with the cam, and a releasable coupling means F, referred to above, between the transmission and the power shaft 23 of the prime mover which is carried by the range.

The transmission 65 involves a housing having flat, vertically disposed front and rear walls 70 and 71, vertically disposed side walls 72 and round top and bottom walls 73. The housing is engaged between and is spaced between the vertical standards 31 on the rear rail of the frame 20, and is fixed thereto as by welding, or the like.

The transmission 65 further involves an upper drive shaft 74 carrying a driven gear 75, a lower drive shaft 76 carrying a driven gear 77, and an intermediate idler shaft 78 carrying an idler pinion 79.

The drive shaft 74 is rotatably and shiftably supported in a pair of axially aligned bearings 80 engaged in the front and rear walls 70 and 71 of the housing. The rear end of the shaft projects rearwardly from the housing and is provided with an extension 81, which extension forms a part of the coupling means F, as will be hereinafter described.

The drive gear 75 is a simple gear wheel and is fixed to the shaft 74 to occur within the housing and between the bearings 80.

The driven shaft 76 is rotatably supported in a pair of axially aligned bearings 82 carried in the front and rear walls 70 and 71 of the housing and has a forward end portion projecting forwardly from the housing.

The driven gear 77 is a simple gear wheel and is fixed to the shaft 76 to occur within the housing and between the bearings 82.

The intermediate idler shaft 78 occurs between the shafts 74 and 76 and is engaged in fixed position in a pair of axially aligned openings 83 provided in the front and rear walls 70 and 71 of the housing.

The idler pinion 79 is a simple gear wheel and is rotatably engaged on the shaft 78 to occur within the housing and mesh with the drive and driven gears 75 and 77.

In addition to the foregoing, the transmission further includes a suitable locking means adapted to lock the drive gear 75 and drive shaft 74 against rotation when the construction is withdrawn from the compartment B and in a manner so that the coupling means F is disengaged. The locking means is shown as including a locking pinion 85 fixed to the rear wall 71 of the housing to freely receive the idler shaft 78 and register with the pinion 79 engaged on said shaft, a rearwardly opening spring cup carried by the front wall of the housing in alignment with the drive shaft 74 and a compression spring 87 carried by the cup and engaging the forward end of the drive shaft 74, and normally yieldingly urging the shaft and the drive gear 75 thereon rearwardly in the housing so that a portion of the drive gear meshes and locks with the fixed locking pinion 85, as clearly illustrated in FIG. 3 of the drawings. In practice, and as illustrated, the drive shaft 74 is provided with a forwardly opening spring receiving socket 88 in which the rear portion of the compression spring 87 is engaged to maintain it in proper working position.

With the locking means set forth above, it will be apparent that the transmission 65 is normally locked and can only function when the drive shaft 74 and the drive gear 75 thereon are urged forwardly out of engagement with the locking pinion, against the resistance of the compression spring 87.

The cam plate 66 of the means E is a simple, flat, horizontally disposed plate having an elongate, horizontally disposed cam slot or opening 90 therein. The plate 66 is fixed to the rear rail 34 of the frame 21 to extend transversely of the construction in spaced relation to the front of the transmission 65.

The crank 67 of the means E is a simple, bar-like element having one end suitably secured to the forward terminal end of the transmission driven shaft 76 and projecting laterally therefrom to occur adjacent the rear side of the cam plate 66.

The cam follower 68 is a simple roller fixed to the outer end of the crank 67 to project forwardly therefrom and enter the cam slot 90 in the cam plate 66.

With the above relationship of parts, it will be apparent that when the transmission 65 is in operation and the driven shaft and crank 76 and 67 are rotated, the cam plate 66 and the frame 21 to which the plate is related or secured is shifted vertically. On the downstroke of the crank, the frame 21 is lowered, while on the upstroke of the crank, the frame 21 is elevated.

The releasable coupling means F that I provide is established between the reduced extension or rod 81 on the drive shaft 74 of the transmission 65, referred to above, and the forward end of the power shaft 23 of the prime mover (not shown), and involves, a forwardly opening socket member 91 on the forward end of the power shaft 23 adapted to oppose the extension 81, a substantially spherical head 92 on the end of the extension 81, and a radially outwardly projecting pin 93 carried by the head. The socket member 91 on the power shaft 23 of the prime mover is provided with a plurality of circumferentially spaced longitudinally disposed and forwardly opening notches 94, establishing what is, in effect, a plurality of circumferentially spaced outwardly projecting fingers 94', the forward ends of which are preferably pointed as at 95.

Upon rearward shifting of the broiler construction in the compartment the head 92 is slidably engaged in the socket member 91 so that the pin 93 thereon slidably enters one of the notches 94 to project radially outwardly therethrough, establishing driving engagement with the adjacent fingers 94'.

It is significant to note that the head 92 and socket member 91 do not have to be in register or exact axial alignment with each other in order for the head 92 to enter the socket member 91, and that when the head 92 is initially engaged in the socket member the pin 93 is directed into engagement in one of the notches 94 by the pointed end 95 of the finger 94' which it initially engages.

When the head 92 is fully engaged in the socket member 91 it engages and seats on a bottom 91' in the socket member, so that further urging of the broiler mechanism toward the shaft 23 releases the locking means of the transmission 65.

In practice it is preferred that the prime mover for the construction be in the form of an electric motor suitably mounted on or at the back of the range so that the power shaft 23 thereof projects forwardly therefrom, through a suitable opening 100 provided in the back wall 13 of the compartment B, to a point where it is easily accessible and so that it can freely receive the extension 81 on the transmission drive shaft 74. It is to be understood, however, that any other suitable form of prime mover may be employed without departing from the spirit of the invention. For example, the prime mover could be a manually operated mechanism, or could be a pneumatically or gas operated mechanism.

It is preferred that the prime mover be under control of a suitable manually operable switch 101 positioned in a convenient, easily accessible location at the front of the range C.

When the construction A is assembled and positioned in working position in the range compartment B it will be apparent that the frame 21 and broiler pan 22 thereon can be easily and conveniently raised and lowered relative to the heating elements 16 in the compartment, by simply actuating or closing the switch 101 until the frame 21 and pan 22 are in the desired position.

In practice, if desired, the construction need not be slidably engaged on rails in the range compartment, as disclosed in the drawings and described above, but it may be releasably supported on suitable posts, hooks or pins arranged within the compartment in any desired manner, without departing from the broad spirit of the invention. In fact, the construction could, if desired, be permanently engaged in the range, in which case the crank mechanism could be coupled directly with the prime mover and the transmission, and the locking means related thereto, could be eliminated.

While I have confined this disclosure to a construction wherein the broiler is shifted vertically in the range compartment in which it is engaged, it is to be understood that it could be arranged to shift laterally or longitudinally of the compartment, and relative to heat sources at the sides, front or rear of the compartment, if desired.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A broiler construction including, a range having a forwardly opening broiler compartment, an elongate support frame engaged in the compartment, an elongate carrier frame positioned above said support frame and adapted to support a broiler pan, adjustable brace means fixed to and extending between the frames and operating means fixed to and extending between said frames and adapted to shift the carrier frame vertically relative to the carrier frame and drive means carried by the range and coupled with the operating means, said drive means including a prime mover having a power shaft accessible at the rear of the compartment, said operating means including a crank carried by one of said frames and operatively coupled with the power shaft and said other frame.

2. A broiler construction including, a range having a forwardly opening broiler compartment with laterally spaced, horizontally disposed support elements, an elongate, horizontally disposed support frame slidably engaged on and supported by said elements, an elongate, horizontally disposed carrier frame positioned adjacent said support frame and adapted to support a broiler pan, adjustable brace means fixed to and extending between the said frames, operating means fixed to and extending between said frames and adapted to shift the frames vertically relative to each other, said drive means including a transmission carried by one frame and having a drive and a driven shaft projecting therefrom and a crank carried by said driven shaft and operatively coupled with the other frame, and drive means for the transmission and including, an electric motor arranged in fixed position relative to the compartment and having a power shaft coupled with said drive shaft.

3. A broiler construction including, a range having a forwardly opening broiler compartment with laterally spaced, horizontally disposed support members, an elongate, horizontally disposed support frame slidably engaged on and supported by said members, an elongate carrier frame positioned above said support frame and adapted to support a broiler pan, parallel motion type link means fixed to and extending between the frames to maintain the frames in parallel planes, operating means fixed to and extending between said frames and adapted to shift the frame vertically relative to each other, said operating means including a transmission carried by said support frame and having a drive and a driven shaft projecting therefrom, and a crank carried by said driven shaft and operatively coupled with the carrier frame and drive means for the transmission and including an electric motor arranged in fixed position relative to the compartment and having a power shaft coupled with said drive shaft.

4. A broiler construction including, a range having a forwardly opening broiler compartment with laterally spaced, horizontally disposed support rails, an elongate, horizontally disposed support frame slidably engaged on and supported by said rails, an elongate, horizontally disposed carrier frame positioned above said support frame and adapted to support a broiler pan, adjustable brace means fixed to and extending between the frame, operating means fixed to and extending between said frames and adapted to shift the frames vertically relative to each other, an electric motor carried by the range and operatively coupled with said operating means, said adjustable brace means including pairs of elongate links pivotally connected intermediate their ends, one link of each pair of links having one end pivotally connected to one of the frames and its other end pivotally and slidably connected to the other frame, the other link of each pair of links having one end pivotally connected with said other frame and having its other end pivotally and slidably connected with said one frame.

5. A broiler construction including, a range having a forwardly opening broiler compartment with laterally spaced, horizontally disposed support rails, an elongate, horizontally disposed support frame slidably engaged on and supported by said rails, an elongate, horizontally disposed carrier frame positioned above said support frame and adapted to support a broiler pan, adjustable brace means fixed to and extending between the frame, operating means fixed to and extending between said frames and adapted to shift the frames vertically relative to each other, an electric motor carried by the range and operatively coupled with said operating means, said adjustable brace means including pairs of elongate links pivotally connected intermediate their ends, one link of each pair of links having one end pivotally connected to one of the frames and its other end pivotally and slidably connected to the other frame, the other link of each pair of links having one end pivotally connected with said other frame and having its other end pivotally and slidably connected with said one frame, there being one pair of links extending longitudinally of the frames and one pair of links extending transversely of the frames.

6. A broiler construction including, a range having a forwardly opening broiler compartment with laterally spaced, horizontally disposed support rails, an elongate, horizontally disposed support frame slidably engaged on and supported by said rails, an elongate, horizontally disposed carrier frame positioned above said support frame and adapted to support a broiler pan, adjustable brace means fixed to and extending between the frame, operating means fixed to and extending between said frames and adapted to shift the frames vertically relative to each other, an electric motor carried by the range and operatively coupled with said operating means, said adjustable brace means including pairs of elongate links pivotally connected intermediate their ends, one link of each pair of links having one end pivotally connected to one of the frames and its other end pivotally and slidably connected to the other frame, the other link of each pair of links having one end pivotally connected with said other frame and having its other end pivotally and slidably connected with said one frame, there being one pair of links at each side of the frames to extend longitudinally of the frames and one pair of links at one end of the frames to extend transversely of the frames.

7. A broiler construction including, a range having a broiler compartment with laterally spaced, horizontally disposed support rails, a support frame slidably engaged on and supported by said rails, a carrier frame positioned above said support frame and adapted to support a broiler pan, adjustable brace means fixed to and extending between the frame, operating means fixed to and extending between said frames and adapted to shift the frame vertically relative to each other, and drive means carried by the range and adapted to drive the operating means, said adjustable brace means including pairs of elongate links pivotally connected intermediate their ends, one link of each pair of links having one end pivotally connected to one of the frames and its other end pivotally and slidably connected to the other frame, the other link of each pair of links having one end pivotally connected with said other frame and having its other end pivotally and slidably connected with said one frame, said operating means including a transmission carried by the support frame, a cam plate carried by said carrier frame and a crank with a cam follower carried by said transmission and operatively coupled with the cam plate, said drive means including an electric motor mounted at the exterior of the range and having a power shaft projecting into the compartment and operatively connected with the transmission.

8. A broiler construction including, a range having a broiler compartment with laterally spaced, horizontally disposed support rails, a support frame slidably engaged on and supported by said rails, a carrier frame positioned above said support frame and adapted to support a broiler pan, adjustable brace means fixed to and extending between the frame, operating means fixed to and extending between said frames and adapted to shift the frames vertically relative to each other, drive means carried by the range and including a motor at the exterior of the range and having a power shaft projecting into the compartment, and releasable coupling means between the drive means and the operating means, said adjustable brace means including pairs of elongate links pivotally connected intermediate their ends, one link of each pair of links having one end pivotally connected to one of the frames and its other end pivotally and slidably connected to the other frame, the other link of each pair of links having one end pivotally connected with said other frame and having its other end pivotally and slidably connected with said one frame, said operating means including a transmission carried by the support frame and having a driven shaft and a drive shaft projecting therefrom and a crank carried by said driven shaft and operatively coupled with the carrier frame, said releasable coupling means including an elongate socket member with a pin-receiving notch in one end thereof fixed on the power shaft notched to normally project into the interior of the compartment, an elongate extension on the drive shaft of the transmission and engageable in said socket member, said extension having a pin thereon to enter the notch in the socket member and establish driving engagement between the shafts.

9. A broiler construction including, a range having a broiler compartment with laterally spaced support members, a support frame releasably engaged on and supported by said members, a carrier frame positioned above said support frame and adapted to support a broiler pan, adjustable brace means fixed to and extending between the frames, operating means fixed to and extending between said frames and adapted to shift the carrier frame vertically relative to the support frame, and drive means carried by the range and coupled with the operating means, said operating means including a transmission carried by the support frame and having an axially shiftable drive shaft carrying a drive gear, an idler shaft carrying an idler pinion meshed with said drive gear, fixed locking pinion normally engaged with a portion of the drive gear, a driven shaft carrying a driven gear meshed with said idler pinion and a crank carried by said driven shaft and operatively coupled with said carrier frame, said drive shaft being adapted to be shifted axially when said releasable coupling is made up and broken whereby the drive gear carried thereby is shifted out of and into engagement with the locking pinion.

10. A broiler construction including, a range having a broiler compartment with laterally spaced support members, a support frame releasably engaged on and supported by said members, a carrier frame positioned above said support frame and adapted to support a broiler pan, adjustable brace means fixed to and extending between the frames, operating means fixed to and extending between said frames and adapted to shift the carrier frame vertically relative to the support frame, and drive means carried by the range and coupled with the operating means, said operating means including a transmission carried by the support frame and having a drive shaft projecting therefrom, wherein said drive means includes a prime mover fixed to the range and has a power shaft projecting into the compartment in axial alignment with the drive shaft of the operating means and wherein said releasable coupling means includes a tubular notched extension on the power shaft, an extension on the drive shaft adapted to slidably enter the tubular extension and having a pin projecting therefrom to project into the notch in said tubular extension and establish driving engagement between the shafts.

References Cited in the file of this patent

UNITED STATES PATENTS

| | | |
|---|---|---|
| 1,181,722 | Ball | May 2, 1916 |
| 1,352,352 | Caswell | Sept. 7, 1920 |
| 1,533,256 | McCaul | Apr. 14, 1925 |
| 1,840,460 | Maul | Jan. 2, 1932 |
| 2,095,449 | Moore | Oct. 12, 1937 |
| 2,119,012 | Kahn | May 31, 1938 |
| 2,127,146 | Smallen | Aug. 16, 1938 |
| 2,582,720 | Roberts | Jan. 15, 1952 |
| 2,854,918 | Merritt | Oct. 7, 1958 |
| 2,876,695 | Racheter | Mar. 10, 1959 |